United States Patent
Takemoto et al.

(10) Patent No.: US 10,160,052 B2
(45) Date of Patent: Dec. 25, 2018

(54) KEYWAY MACHINING PATH CREATING DEVICE FOR WIRE ELECTRIC DISCHARGE MACHINE

(71) Applicant: FANUC Corporation, Yamanashi (JP)

(72) Inventors: Masanobu Takemoto, Yamanashi (JP); Kaoru Hiraga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 406 days.

(21) Appl. No.: 14/879,170

(22) Filed: Oct. 9, 2015

(65) Prior Publication Data
US 2016/0107251 A1    Apr. 21, 2016

(30) Foreign Application Priority Data

Oct. 16, 2014    (JP) .................. 2014-211868

(51) Int. Cl.
*B23H 1/02*    (2006.01)
*B23H 7/06*    (2006.01)
(Continued)

(52) U.S. Cl.
CPC ............... *B23H 1/02* (2013.01); *B23H 7/06* (2013.01); *B23H 7/20* (2013.01); *G05B 19/188* (2013.01);
(Continued)

(58) Field of Classification Search
CPC ... B23H 1/02; B23H 7/06; B23H 7/20; G05B 19/188; G05B 19/41; G05B 2219/35219;
(Continued)

(56) References Cited

U.S. PATENT DOCUMENTS

| 4,896,013 A | 1/1990 | Fricke et al. |
| 5,357,072 A | 10/1994 | Garwick |

(Continued)

FOREIGN PATENT DOCUMENTS

| CN | 101856755 A | 10/2010 |
| CN | 103028784 A | 4/2013 |

(Continued)

OTHER PUBLICATIONS

Machine translation of JPS6352907, Seki Maki, Quality Judging Method for Making Hole Conditions, Mar. 7, 1988, 3 pages.*

(Continued)

*Primary Examiner* — Thomas C Lee
*Assistant Examiner* — Tri T Nguyen
(74) *Attorney, Agent, or Firm* — Hauptman Ham, LLP

(57) ABSTRACT

A machining path creating device for wire electric discharge machines creates a machining path for machining a keyway in a side surface of a round hole. The machining path creating unit compares a "keyway depth" and a diameter of the round hole input by an operator. The machining path creating device determines that the input "keyway depth" is a cut depth when the input "keyway depth" is smaller than the diameter of the round hole and that a value obtained by subtracting the diameter of the round hole from the input "keyway depth" is the cut depth when the input "keyway depth" is larger than the diameter of the round hole.

8 Claims, 11 Drawing Sheets

(51) Int. Cl.
  *B23H 7/20* (2006.01)
  *G05B 19/41* (2006.01)
  *G05B 19/18* (2006.01)
(52) U.S. Cl.
  CPC .... *G05B 19/41* (2013.01); *G05B 2219/35097* (2013.01); *G05B 2219/35219* (2013.01); *G05B 2219/45043* (2013.01); *G05B 2219/45221* (2013.01)
(58) Field of Classification Search
  CPC .......... G05B 2219/35097; G05B 2219/45221; G05B 2219/45043
  See application file for complete search history.

(56) References Cited

U.S. PATENT DOCUMENTS

| | | | | |
|---|---|---|---|---|
| 2008/0310492 | A1* | 12/2008 | Kasai | H04B 3/04 375/232 |
| 2012/0253583 | A1* | 10/2012 | Herdle | E21C 35/08 701/28 |
| 2015/0367436 | A1 | 12/2015 | Hiraga et al. | |

FOREIGN PATENT DOCUMENTS

| | | |
|---|---|---|
| CN | 104084656 A | 10/2014 |
| EP | 0685286 A1 | 12/1995 |
| JP | H08153132 A | 6/1996 |
| JP | 2007-307661 A | 11/2007 |
| JP | 2016-7662 A | 1/2016 |

OTHER PUBLICATIONS

Office Action in CN Application No. 201510666869.4, dated Mar. 29, 2017.
Decision to Grant a Patent in JP Application No. 2014-211868, dated Feb. 9, 2016.
Extended European Search Report in EP Application No. 15188665.2, dated Apr. 6, 2016.
Din: "Extract from DIN 6885-1:1968-08", Aug. 1, 1968, XP055260210, Retrieved from the Internet: https://www.ganter-griff.com/uploads/tx_rldownloadlist/keyway_and_key_details_din_6885_page_1.pdf [Retrieved on Mar. 22, 2016].
Hans Hoischen, "Technisches Zeichnen" In: Technisches Zeichnen, Jan. 1, 1990, Cornelsen, Dusseldorf, XP055224947, pp. 299-301.

* cited by examiner

```
O0001(MAIN)

G92 X0 Y0                          PRESENT POSITION IS USED AS
                                   PROGRAM ORIGIN

G123 X-100.0 Y-100.0 B10.0         RETURN TO PROGRAM ORIGIN
T20.0 D50.0 A0.0

M30                                END PROGRAM
```

X: CENTER X COORDINATE    Y: CENTER Y COORDINATE
B: KEYWAY WIDTH    T: KEYWAY DEPTH
D: HOLE DIAMETER    A: ANGLE

```
O0001(MAIN)
G92 X0 Y0                    PRESENT POSITION IS USED AS
                             PROGRAM ORIGIN

G123 X-100.0 Y-100.0 B10.0   RETURN TO PROGRAM ORIGIN
T20.0 D50.0 A0.0

M30                          END PROGRAM
```

G123 X-100.0 Y-100.0 B10.0 T20.0 D50.0 A0.0

X: CENTER X COORDINATE   Y: CENTER Y COORDINATE
B: KEYWAY WIDTH   T: KEYWAY DEPTH
D: HOLE DIAMETER   A: ANGLE

FIG. 9

```
O8000(G123 MACRO)
IF[#20LT#7] GOTO100        GO TO N100 IF (KEYWAY DEPTH) < (HOLE DIAMETER)
IF[#20GT#7] GOTO110        GO TO N110 IF (KEYWAY DEPTH) > (HOLE DIAMETER)
#100=#20                   IF (KEYWAY DEPTH) = (HOLE DIAMETER), (CUT DEPTH (#100)) = (KEYWAY
GOTO200                    DEPTH) AND GO TO N200
N100
#100=#20                   IF (KEYWAY DEPTH) > (HOLE DIAMETER), (CUT DEPTH (#100)) = (KEYWAY
GOTO200                    DEPTH) AND GO TO N200
N110
#100=#20-#7                IF (KEYWAY DEPTH) > (HOLE DIAMETER), (CUT DEPTH (#100)) =
GOTO200                    (KEYWAY DEPTH) - (HOLE DIAMETER) AND GO TO N200
N200
G00 G90 G53 X#24 Y#25      MOVE TO HOLE CENTER POSITION (PARAMETER X:#24 AND Y:#25)
#5201=#1                   ROTATION ANGLE (PARAMETER A:#1)
G92 X0 Y0                  PRESENT POSITION IS PROGRAM ORIGIN
G00 G91 X-[#2/2-2.5] Y[#7/2-5.0]   MOVE FAST TO CUT PORTION ON LEFT SIDE OF KEYWAY SIDE SURFACE
                                   (PARAMETER D:#7 AND B:#2)
G01 G42 X-2.5 Y2.5         MOVE TO THE FRONT OF CUT PORTION IN OFFSET MANNER
Y[#100+2.5]                MACHINE LEFT SIDE OF KEYWAY SIDE SURFACE (PARAMETER T:#20)
X#2                        MACHINE KEYWAY BOTTOM
Y-[#100+2.5]               MACHINE RIGHT SIDE OF KEYWAY SIDE SURFACE
G40 X-2.5 Y-2.5            MOVE WHILE CANCELING OFFSET
G00 G90 X0 Y0              RETURN TO PROGRAM ORIGIN
M99                        RETURN TO MAIN PROGRAM
```

FIG. 10

```
O8000(G123 MACRO)
IF[[#20/#2]GT#101] GOTO100     IF (KEYWAY DEPTH)/(KEYWAY WIDTH) > (THRESHOLD (#101), GO TO
                               N100
#100=#20-#7                    IF (KEYWAY DEPTH)/(KEYWAY WIDTH) < (THRESHOLD (#101),
GOTO200                    (A) (CUT DEPTH (#100)) = (KEYWAY DEPTH)

N100                           IF (KEYWAY DEPTH)/(KEYWAY WIDTH) > (THRESHOLD (#101),
#100=#20                       (CUT DEPTH (#100)) = (KEYWAY DEPTH) - (HOLE DIAMETER)
GOTO200

N200
G00 G90 G53 X#24 Y#25          MOVE TO HOLE CENTER POSITION (PARAMETER X:#24 AND Y:#25)
#5201=#1                       ROTATION ANGLE (PARAMETER A:#1)
G92 X0 Y0                      PRESENT POSITION IS PROGRAM ORIGIN

G00 G91 X-[#2/2-2.5] Y[#7/2-5.0]  MOVE FAST TO CUT PORTION ON LEFT SIDE OF KEYWAY SIDE
                                  SURFACE (PARAMETER D:#7 AND B:#2)
G01 G42 X-2.5 Y2.5             MOVE TO THE FRONT OF CUT PORTION IN OFFSET MANNER
Y[#100+2.5]                    MACHINE LEFT SIDE OF KEYWAY SIDE SURFACE (PARAMETER T:#20)
X#2                            MACHINE KEYWAY BOTTOM
Y-[#100+2.5]                   MACHINE RIGHT SIDE OF KEYWAY SIDE SURFACE
G40 X-2.5 Y-2.5                MOVE WHILE CANCELING OFFSET

G00 G90 X0 Y0                  RETURN TO PROGRAM ORIGIN
M99                            RETURN TO MAIN PROGRAM
```

FIG. 11

```
O8000(G123 MACRO)
IF[ABS[#20-#2]GT#101] GOTO100                IF |(KEYWAY DEPTH) - (KEYWAY WIDTH)| > (THRESHOLD (#101)),
#100=#20                                     GO TO N100
GOTO200
                                             IF |(KEYWAY DEPTH) - (KEYWAY WIDTH)| < (THRESHOLD (#101)),
                                         (A) (KEYWAY DEPTH (#100)) = (CUT DEPTH)
N100
#100=#20-#7                                  IF |(KEYWAY DEPTH) - (KEYWAY WIDTH)| > (THRESHOLD (#101)),
GOTO200                                      (CUT DEPTH (#100)) = (KEYWAY DEPTH) - (HOLE DIAMETER)

N200
G00 G90 G53 X#24 Y#25                        MOVE TO HOLE CENTER POSITION (PARAMETER X:#24 AND Y:#25)
#5201=#1                                     ROTATION ANGLE (PARAMETER A:#1)
G92 X0 Y0                                    PRESENT POSITION IS PROGRAM ORIGIN

G00 G91 X-[#2/2-2.5] Y[#7/2-5.0]             MOVE FAST TO CUT PORTION ON LEFT SIDE OF KEYWAY SIDE
                                             SURFACE (PARAMETER D:#7 AND B:#2)
G01 G42 X-2.5 Y2.5                           MOVE TO THE FRONT OF CUT PORTION IN OFFSET MANNER
Y[#100+2.5]                                  MACHINE LEFT SIDE OF KEYWAY SIDE SURFACE (PARAMETER T:#20)
X#2                                          MACHINE KEYWAY BOTTOM
Y-[#100+2.5]                                 MACHINE RIGHT SIDE OF KEYWAY SIDE SURFACE
G40 X-2.5 Y-2.5                              MOVE WHILE CANCELING OFFSET

G00 G90 X0 Y0                                RETURN TO PROGRAM ORIGIN
M99                                          RETURN TO MAIN PROGRAM
```

KEYWAY MACHINING PATH CREATING DEVICE FOR WIRE ELECTRIC DISCHARGE MACHINE

RELATED APPLICATIONS

The present application claims priority to Japanese Application Number 2014-211868, filed Oct. 16, 2014, the disclosure of which is hereby incorporated by reference herein in its entirety.

BACKGROUND OF THE INVENTION

1. Field of the Invention

The present invention relates to a keyway machining path creating device for wire electric discharge machines.

2. Description of the Related Art

A keyway is machined in a side surface of a round hole formed in a workpiece using a wire electric discharge machine.

Japanese Patent Application Laid-Open No. 8-153132 discloses a CAD/CAM apparatus capable of automatically performing plotting only by selecting a defined hole and inputting parameters to thereby generate keyway machining data and NC data. The CAD/CAM apparatus diagnoses keyway parameters including a hole diameter and a keyway depth using a keyway database registered in advance.

In order to create a machining path using a keyway machining path creating device for wire electric discharge machines, a user designates the shape (a keyway width, a keyway depth, and the like) of a keyway to be machined and designates the diameter and the center position of a round hole machined in a workpiece. Here, the following two methods are generally used to designate a keyway depth.

According to Method 1, the keyway depth is designated by a cut depth (t) which is a distance from a hole side surface at a keyway width center to a keyway bottom.

According to Method 2, the keyway depth is designated by a measured depth (l) which is a distance from a hole side surface on the side opposite a keyway width center to a keyway bottom.

FIG. 1 illustrates a keyway depth as the distance t (cut depth) from a hole side surface at a keyway width center to a keyway bottom. On the other hand, FIG. 2 illustrates a keyway depth as the distance l (measured depth) which is the distance from a hole side surface on the side opposite a keyway width center to a keyway bottom. In this manner, machining dimensions of a keyway are generally expressed by the method illustrated in FIG. 1 or 2. An operator creates a keyway machining NC program using a keyway machining path creating device for wire electric discharge machines by referring to the dimensions illustrated in FIG. 1 or 2.

FIG. 3 is an example of a display screen for creating a keyway machining program. Moreover, FIG. 4 is an example of a macro program for creating a keyway machining path. An operator inputs the keyway machining dimensions illustrated in FIG. 3 to a machining path creating device prepared as a macro program or screen to create a keyway machining NC program.

When creating a keyway machining NC program, an operator has to understand whether the value "keyway depth" input to the keyway machining path creating device is the "cut depth t" or the "measured depth l".

For example, when a keyway depth has to be designated by such a "cut depth t" as illustrated in FIG. 1 on a keyway machining program creation screen of FIG. 3 whereas the keyway depth is designated by such a "measured depth l" as illustrated in FIG. 2 on a machining drawing, the operator has to input a value obtained by subtracting the hole diameter d from the measured depth l to the keyway machining path creating device as the "keyway depth".

Thus, there is a possibility that the operator miscalculates the keyway depth or input wrong dimensions (for example, an operator may erroneously inputs the "measured depth l" on the keyway machining program creation screen of FIG. 3, instead of the "keyway depth (t)"). Such an input error results in the inability to machine a keyway in correct dimensions.

As a method for solving this problem, a method of allowing an operator to input the dimensions of both the "cut depth t" and the "measured depth l" to the machining path creating device may be used. However, this method increases the number of input items, which thus increases the burden on the operator. Moreover, in general, since only one of the "cut depth t" and the "measured depth l" appears in a machining drawing, the operator has to perform the calculation and may make miscalculations similarly to the above-described problem.

As another solving method, the machining path creating device may have a function of switching an input keyway depth to the "cut depth t" or the "measured depth l". In this case, the operator uses a machining path creating device which is switched according to a machining drawing. However, the operator may make a mistake in the switching, and in such a case, it is not possible to machine a keyway in correct dimensions.

In view of the above, the operator has to determine whether the method of designating a keyway depth in the machining path creating device used is based on Method 1 or 2 described above and then designates appropriate data. For example, when the keyway depth is designated by a "measured depth" in a machining drawing whereas the keyway depth is designated by a "cut depth" in a keyway machining path creating device used, the operator has to convert the measured depth designated in the machining drawing to a cut depth (subtract a diameter of a round hole from the designated measured depth to calculate a cut depth) and designate the calculated keyway depth (cut depth) to the keyway machining path creating device. Thus, the planning operation incurs a lot of labor and time and the operator may designate a wrong keyway depth.

SUMMARY OF THE INVENTION

Therefore, an object of the present invention is to obviate the problems of the conventional technique and to provide a keyway machining path creating device for wire electric discharge machines capable of allowing an operator to input a keyway shape and create a machining path without the need to understand whether a designated keyway depth is a "measured depth" or a "cut depth".

A machining path creating device for wire electric discharge machines according to the present invention creates a machining path for machining a keyway in a side surface of a round hole.

A machining path creating device according to a first aspect includes: a keyway shape input unit that inputs a shape of a keyway to be machined; a hole shape input unit that inputs a diameter and a center position of the round hole; and a machining path creating unit that creates a machining path. The machining path creating unit compares a keyway depth input by the keyway shape input unit with the diameter of the round hole input by the hole shape input unit. When the input keyway depth is smaller than the diameter of the round hole, the machining path creating unit determines the input keyway depth as a cut depth of the keyway which is a distance from the hole side surface to a keyway bottom. When the input keyway depth is larger than the diameter of the round hole, the machining path creating unit determines a difference between the input keyway depth and the diameter of the round hole as the cut depth of the keyway.

A machining path creating device according to a second aspect includes: a keyway shape input unit that inputs a shape of a keyway to be machined; a hole shape input unit that inputs a diameter and a center position of the round hole; and a machining path creating unit that creates a machining path. The machining path creating unit compares a keyway depth input by the keyway shape input unit with the diameter of the round hole input by the hole shape input unit. When the input keyway depth is smaller than the diameter of the round hole, the machining path creating unit determines the input keyway depth as a cut depth of the keyway which is a distance from the hole side surface to a keyway bottom. When the input keyway depth is larger than the diameter of the round hole, the machining path creating unit determines a difference between the input keyway depth and the diameter of the round hole as the cut depth of the keyway. The machining path creating unit measures the center position of the round hole by bringing a wire electrode or a touch probe into contact with a workpiece to thereby create the machining path.

The machining path creating unit may stop creating the machining path when determining that a ratio between the cut depth of the keyway determined by the machining path creating unit and the diameter of the round hole exceeds a predetermined threshold.

The machining path creating unit may stop creating the machining path when determining that a difference between the diameter of the round hole and the cut depth of the keyway determined by the machining path creating unit is smaller than a predetermined threshold.

A machining path creating device according to a third aspect includes: a keyway shape input unit that inputs a shape of a keyway to be machined; a hole shape input unit that inputs a diameter and a center position of the round hole; and a machining path creating unit that creates a machining path. The machining path creating unit compares a keyway depth and a keyway width input by the keyway shape input unit, when a ratio or difference between the input keyway depth and the input keyway width does not exceed a predetermined threshold, the machining path creating unit creates the machining path such that the keyway depth is used as a cut depth of the keyway which is a distance from the hole side surface to a keyway bottom, and when the ratio or difference between the input keyway depth and the input keyway width exceeds the threshold, the machining path creating unit creates the machining path such that a difference between the keyway depth and the diameter of the round hole is used as the cut depth of the keyway.

A machining path creating device according to a fourth aspect includes: a keyway shape input unit that inputs a shape of a keyway to be machined; a hole shape input unit that inputs a diameter of the round hole; and a machining path creating unit that creates a machining path. The machining path creating unit compares a keyway depth and a keyway width input by the keyway shape input unit. When a ratio or difference between the input keyway depth and the input keyway width does not exceed a predetermined threshold, the machining path creating unit determines the keyway depth as a cut depth of the keyway which is a distance from the hole side surface to a keyway bottom. When the ratio or difference between the input keyway depth and the input keyway width exceeds the threshold, the machining path creating unit determines a difference between the keyway depth and the diameter of the round hole as the cut depth of the keyway. The machining path creating unit measures a center position of the round hole by bringing a wire electrode or a touch probe into contact with a workpiece to thereby create the machining path.

The machining path creating unit may stop creating the machining path when determining that a ratio between the cut depth of the keyway determined by the machining path creating unit and the diameter of the round hole exceeds a predetermined threshold.

The machining path creating unit may stop creating the machining path when determining that a difference between the diameter of the round hole and the cut depth of the keyway determined by the machining path creating unit is smaller than a predetermined threshold.

According to the present invention, it is possible to provide a keyway machining path creating device for wire electric discharge machines capable of allowing an operator to input a keyway shape and create a machining path without the need to understand whether a designated keyway depth is a "measured depth" or a "cut depth".

BRIEF DESCRIPTION OF THE DRAWINGS

The above and other objects and features of the present invention will be apparent from the following description of an embodiment with reference to the appended drawings, in which:

FIG. 9 is a diagram illustrating an example of a machining program that compares a designated keyway depth (t) with a hole diameter (d) to calculate a cut depth;

FIG. 10 is a diagram illustrating an example of a machining program that compares the ratios of a keyway depth (t or l) to a keyway width b to calculate a cut depth;

FIG. 11 is a diagram illustrating a machining program that compares a difference between a keyway depth (t or l) and a keyway width b with a threshold to calculate a cut depth;

DESCRIPTION OF THE PREFERRED EMBODIMENTS

Figure 1:
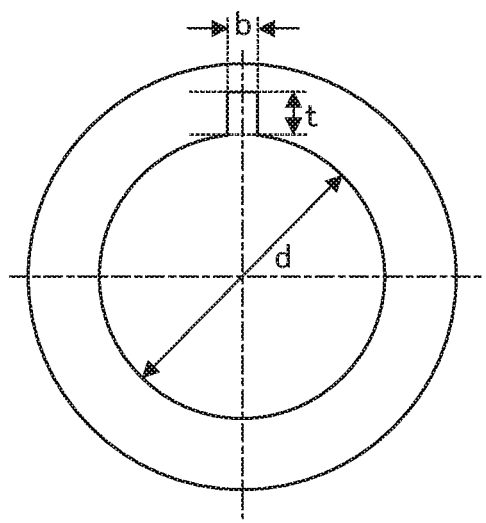
FIG. 1 is a diagram for describing a method of designating a keyway depth by the distance t (cut depth) from a hole side surface at a keyway width center to a keyway bottom.
Figure 2:
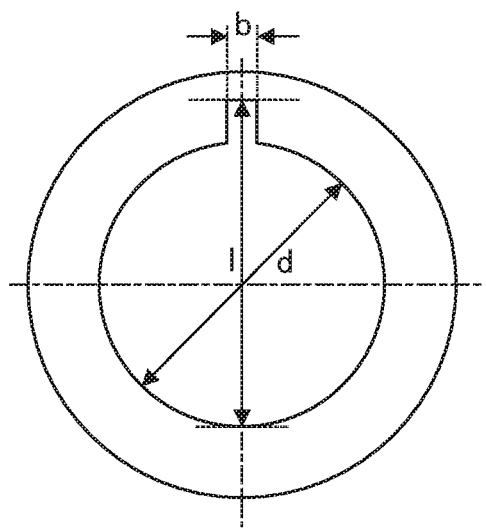
FIG. 2 is a diagram for describing a method of designating a keyway depth by the distance (measured depth) from a hole side surface on the side opposite a keyway width center to a keyway bottom.

First, an overview of a method of creating a machining path by a keyway machining path creating device according to the present invention will be described.

In the present invention, a machining path is created so that a keyway can be machined always in correct dimensions even when any one of a "cut depth t" and a "measured depth l" is input to a keyway depth designating unit without the need to providing a plurality of keyway depth designating units of a keyway shape input unit in a keyway machining path creating device or switching a keyway depth designating method.

When the keyway machining path creating device creates a machining path, the keyway machining path creating device compares the values "keyway depth" with "hole diameter" input by an operator. Moreover, in general, the "cut depth t" is sufficiently smaller than the "hole diameter d" and the "measured depth l" is always larger than the "hole diameter d".

In view of the above, if (keyway depth)>(hole diameter), a machining path is created such that a value obtained by subtracting the hole diameter d from the input keyway depth is used as the cut depth t.

If (keyway depth)≤(hole diameter d), a machining path is created such that the input keyway depth is used as the cut depth t.

Whether the input keyway depth is larger than the hole diameter d is determined based on whether a difference between the keyway depth and the hole diameter d is larger than a threshold or whether a ratio ((keyway depth)/(hole diameter d)) of the keyway depth to the hole diameter d is larger than a threshold.

In general, the "cut depth t" is sufficiently smaller than the "hole diameter d". Thus, when the keyway machining path creating device determines that the "cut depth t" is much larger than the "hole diameter d" (that is, the ratio (t/d) of the "cut depth t" to the "hole diameter d" exceeds a threshold), it is determined that there is an error in the value "keyway depth" input to the keyway machining path creating device and a machining path is not created.

Moreover, rather than comparing a "keyway depth" input by an operator with a "hole diameter," a "keyway depth" input by the operator may be compared with a "keyway width". In this case, when the ratio or difference between the "keyway depth" and the "keyway width" does not exceed a predetermined threshold, a machining path is created such that the input keyway depth is used as the cut depth t, whereas when the ratio or difference between the "keyway depth" and the "keyway width" exceeds the threshold, a machining path may be created such that a value obtained by subtracting the hole diameter d from the input keyway depth is used as the cut depth t.

Next, a keyway machining path creating device according to an embodiment of the present invention will be described.

The machining path creating device is formed of a numerical controller, a computer, or the like and includes a keyway designating unit that designates the shape (a keyway depth and a keyway width) of a keyway to be machined. Thus, the machining path creating device defines a machining path to be created as a keyway machining path. Further, the machining path creating device includes a round hole designating unit that designates the diameter and the center position of a round hole. In this way, the machining path creating device determines a keyway machining position (the position in a machining region of the wire electric discharge machine).

When creating a keyway machining path from a keyway shape designated by the keyway designating unit and the diameter (hole diameter) and the center position of a round hole, designated by the round hole designating unit, the machining path creating device compares the value "keyway depth" included in the designated keyway shape and the designated value "round hole diameter (hole diameter)". If (keyway depth)≤(hole diameter), a machining path is created such that the designated (input) "keyway depth" is used as the cut depth t. If (keyway depth)>(hole diameter), a machining path is created such that a value obtained by subtracting the "hole diameter" from the designated (input) "keyway depth" is used as the cut depth t.

When creating the machining path, the machining path creating device may compare the value of the designated "keyway depth" with the value "keyway width" rather than comparing the value of the designated "keyway depth" with the designated "round hole diameter (hole diameter)". In this case, when the ratio or the difference between the "keyway depth" and the "keyway width" designated by the keyway designating unit does not exceed a threshold, a machining path is created such that the designated (input) "keyway depth" is used as the cut depth t. On the other hand, when the ratio or the difference between the "keyway depth" and the "keyway width" designated by the keyway designating unit exceeds the threshold, a machining path is created such that a value obtained by subtracting the "hole diameter" from the designated (input) "keyway depth" is used as the cut depth t.

A machining path creating device according to an embodiment of the present invention is mounted on a numerical controller that controls a wire electric discharge machine and creates a keyway machining program based on the data input by a display/keyboard. Hereinafter, a machining path creating device according to the embodiment will be described with reference to FIGS. 5 and 6.

Figure 5:
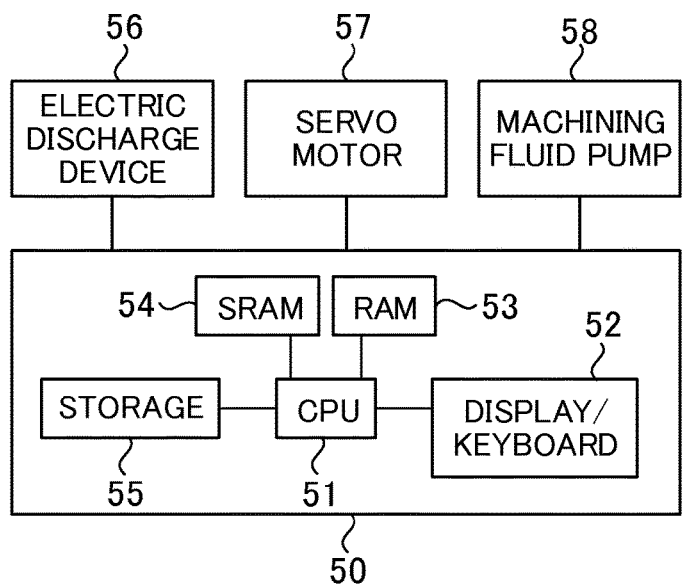
FIG. 5 is a schematic diagram of a numerical controller which controls a wire electric discharge machine, and on which a machining path creating device according to an embodiment of the present invention is mounted.

FIG. 5 illustrates a numerical controller which controls a wire electric discharge machine, and on which a machining path creating device according to an embodiment of the present invention is mounted.

The wire electric discharge machine includes an electric discharge device 56 that applies a voltage between a wire electrode and a workpiece to supply a current, a servo motor 57 that drives the respective axes of the wire electric discharge machine, and a machining fluid pump 58 for circulating a machining fluid through a machining tank, a sewage tank, and a fresh water tank. The operation of the wire electric discharge machine (the electric discharge device 56, the servo motor 57 for driving respective axes, and the machining fluid pump 58) is controlled by a numerical controller 50. The numerical controller 50 includes a CPU 51, a display/keyboard 52, a RAM 53, a SRAM 54, and a storage 55. The display/keyboard 52 includes a display and a keyboard.

The shape of a keyway, a round hole diameter, and a round hole center position, input from the display/keyboard 52, are stored in the storage 55 or the SRAM 54. A software for creating a machining path is registered in the storage 55 and is copied into the RAM 53 and executed using the CPU 51 after the numerical controller 50 is powered on. The created machining program is stored in the storage 55 or the SRAM 54.

When the created machining program is executed, the CPU 51 analyses the machining program and issues a command to the electric discharge device 56, the servo motor 57, and the machining fluid pump 58. The electric discharge device 56, the servo motor 57, and the machining fluid pump 58 operate based on the command, and the wire electric discharge machine moves the wire electrode while jetting the machining fluid toward the wire electrode to cause electric discharge to occur between the wire and the workpiece to machine the workpiece.

Figures 3, 4:
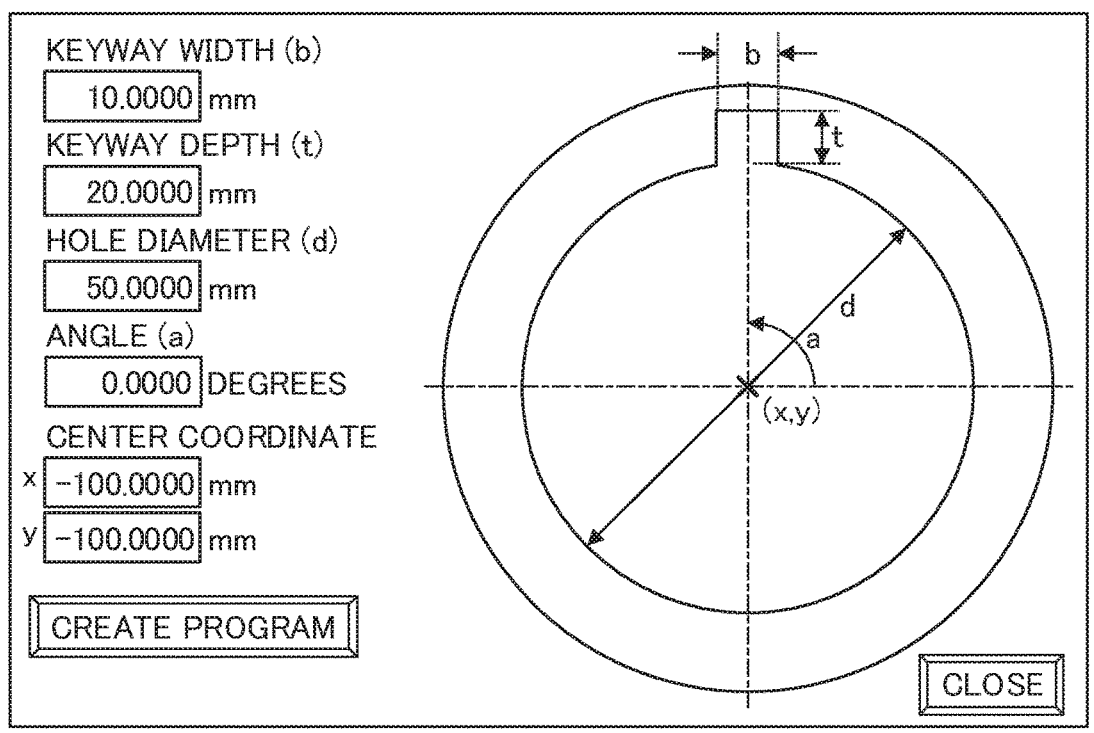
FIG. 3 is a diagram illustrating an example of a display screen for creating a keyway machining program.
FIG. 4 is a diagram illustrating an example of a macro program for creating a keyway machining path.
Figure 6:
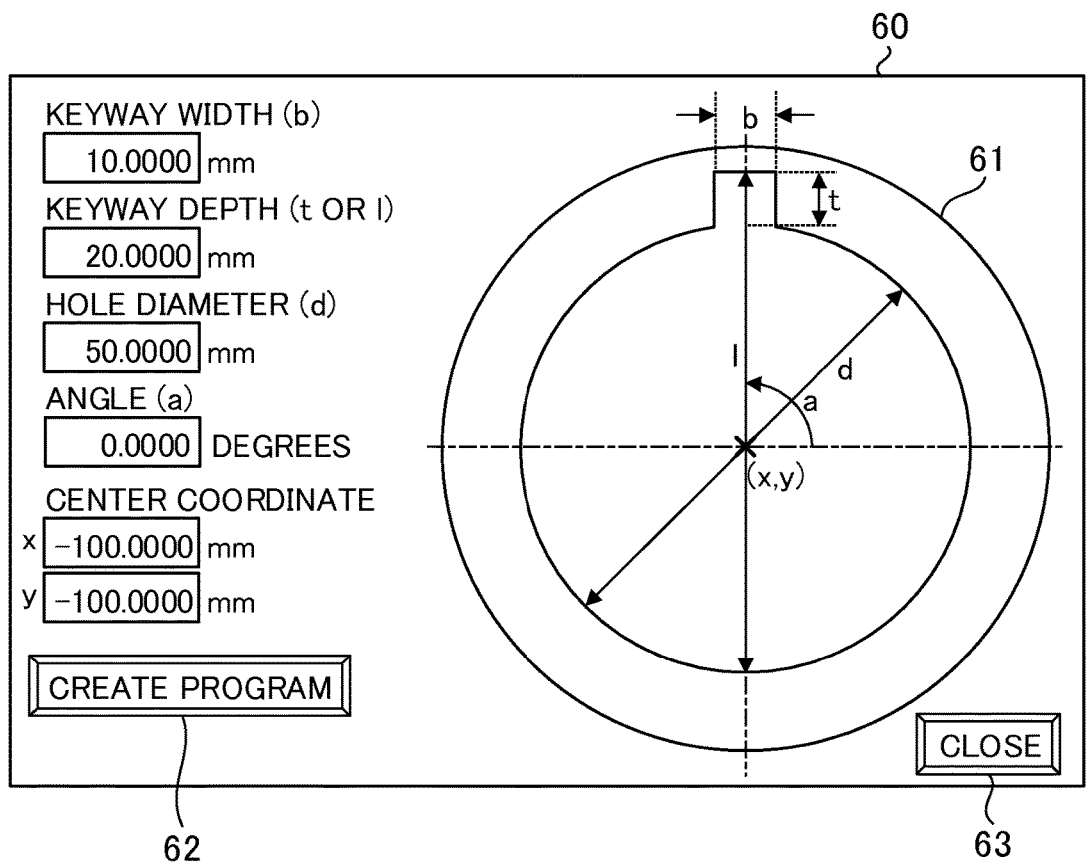
FIG. 6 illustrates an example of a screen that the numerical controller of FIG. 5, on which the machining path creating device is mounted, displays on a display of a display/keyboard in order to create a keyway machining program.

FIG. 6 is an example of a screen that the numerical controller 50 of FIG. 5 on which the machining path creating device is mounted displays on a display of the display/keyboard 52 in order to create a keyway machining program. The exemplary screen 60 of FIG. 6 is different from the screen illustrated in FIG. 3 (conventional technique) in that an operator is requested to input a keyway depth t to the field "keyway depth" in the exemplary screen illustrated in FIG. 3, whereas an operator is allowed to input any one of a keyway depth t and a measured depth l to the field "keyway depth" in the exemplary screen 60 of FIG. 6.

The exemplary screen 60 illustrated in FIG. 6 includes a workpiece image 61, a region in which specifications (a keyway width (b), a keyway depth (t or l), a hole diameter (d), an angle (a) indicating the position at which a keyway is formed in a hole, and a center coordinate (x, y) indicating the center position of the hole) for machining a keyway are input, a program creating button 62, and a screen close button 63. When an operator inputs data and presses the program creating button 62, a machining program is created. When the screen close button 63 is pressed, the screen is closed and creation of a keyway machining program is stopped.

The numerical controller 50 receives the specifications for machining a keyway from the screen illustrated in FIG. 6. The numerical controller 50 (machining path creating device) creates a machining program for creating a keyway machining path based on the input specifications. When the numerical controller 50 executes the created machining program and the wire electric discharge machine performs machining, a keyway 40 can be machined in a workpiece 30 along the path illustrated in FIG. 7.

First, an operator inputs a "keyway depth (t or l)" and a "keyway width (b)" to the display screen in order to designate the keyway shape. In this case, the operator may input any one of the "cut depth t" and the "measured depth l" to the "keyway depth (t or l)".

Subsequently, the operator inputs a "hole diameter (d)," an "angle (a)," and a "center coordinate (x, y)" in order to designate a keyway position. In the exemplary screen 60 of FIG. 6, although the center coordinate (x, y) indicating the position of a hole center is input from the display screen, the center position of a round hole may be measured by bringing a wire electrode or a touch probe into contact with the workpiece 30, and the coordinate of the measured center position may be input to and used by the numerical controller 50 (machining path creating device).

Lastly, the operator presses the "Create Program" button 62.

The machining path creating device (numerical controller 50) detects the pressing of the "Create Program" button 62 and acquires the respective data values input on the screen. In this case, the machining path creating device recognizes that a keyway shape is included in the acquired data and compares the "keyway depth (t or l)" with the "hole diameter (d)" to calculate a cut depth.

If (keyway depth)>(hole diameter), a value obtained by subtracting the hole diameter d from the input keyway depth is used as the cut depth t.

If (keyway depth)≥(hole diameter d), the input keyway depth is used as the cut depth t.

Alternatively, the machining path creating device (numerical controller 50) may recognize that the keyway shape ("keyway depth (t or l)" and "keyway width (b)") is included in the acquired data and compare the values "keyway depth (t or l)" with "keyway width (b)" to calculate the cut depth.

When the ratio or difference between the "keyway depth" and the "keyway width" does not exceed a predetermined threshold, the input keyway depth is used as the cut depth t.

On the other hand, when the ratio or difference between the "keyway depth" and the "keyway width" exceeds the threshold, a value obtained by subtracting the hole diameter d from the input keyway depth is used as the cut depth t.

Subsequently, the machining path creating device evaluates the input values "keyway depth" and "hole diameter" using the calculated cut depth. In general, since the "cut depth" is sufficiently smaller than the "hole diameter," when (cut depth)/(hole diameter) is larger than a threshold, the machining path creating device determines that there is an error in the input value and does not create a machining path (see FIG. 12). In this case, a warning message indicating an error in the input values may be displayed. Alternatively, when the value obtained by subtracting the "cut depth" from the "hole diameter" is smaller than the threshold, the machining path creating device determines that there is an error in the input values and does not create a machining path (see FIG. 13). In this case, a warning message indicating an error in the input values may be displayed. If the evaluation result shows that there is no error in the input values, an NC program that machines the calculated cut depth is created.

Figure 14:
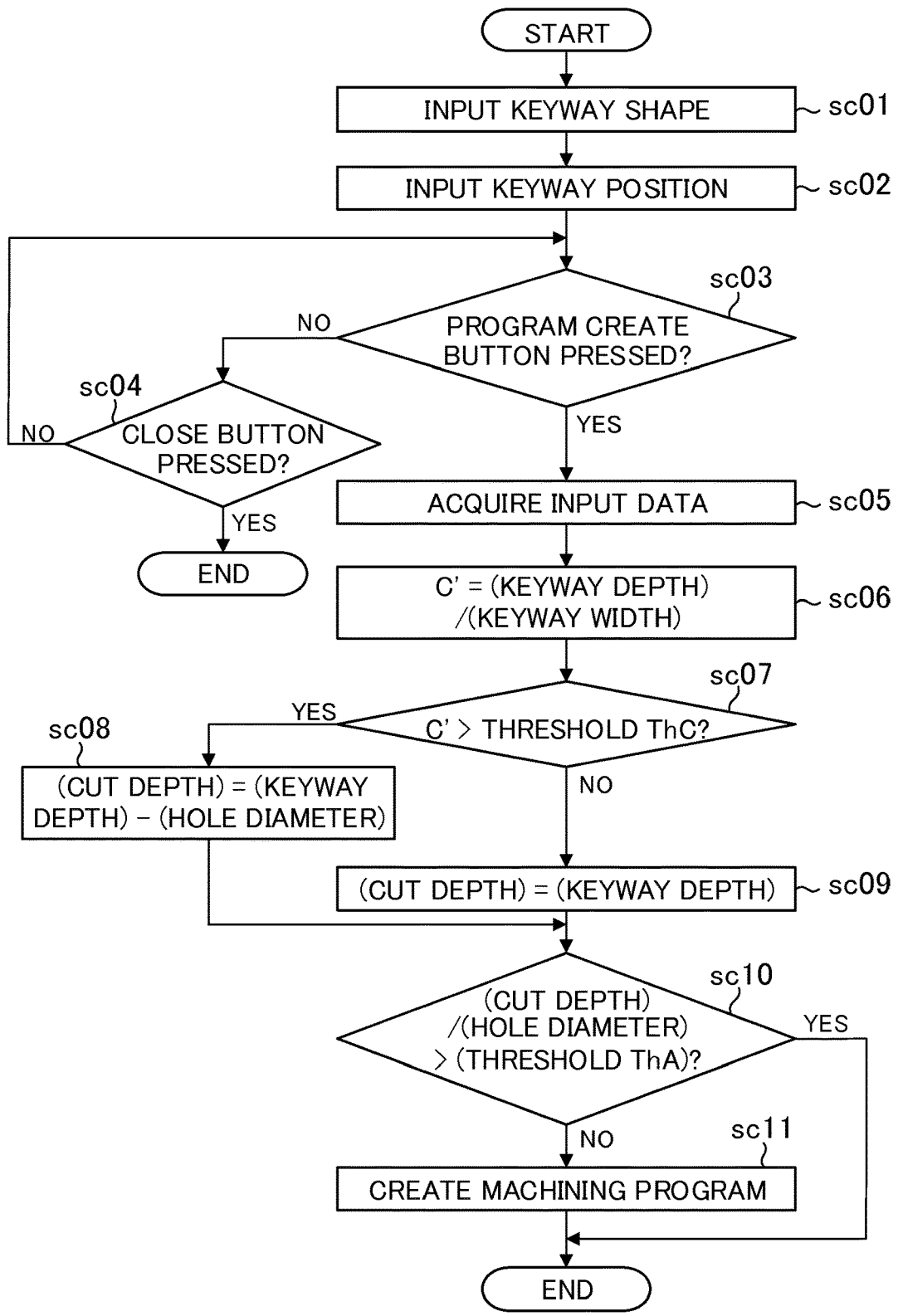
FIG. 14 is a flowchart of a process of comparing the ratio of a keyway depth (t or l) to a keyway width (b) with a threshold to calculate a cut depth and determining an error in the input value based on the ratio of the calculated cut depth to the hole diameter.

The process illustrated in FIG. 14 illustrates an example in which the ratio between a "keyway depth (t or l)" and a "keyway width (b)" is compared with a threshold to calculate a cut depth, and the ratio between the calculated "cut depth" and a "hole diameter" is compared with a threshold to determine whether there is an error in the values input to the machining path creating device.

Figure 15:
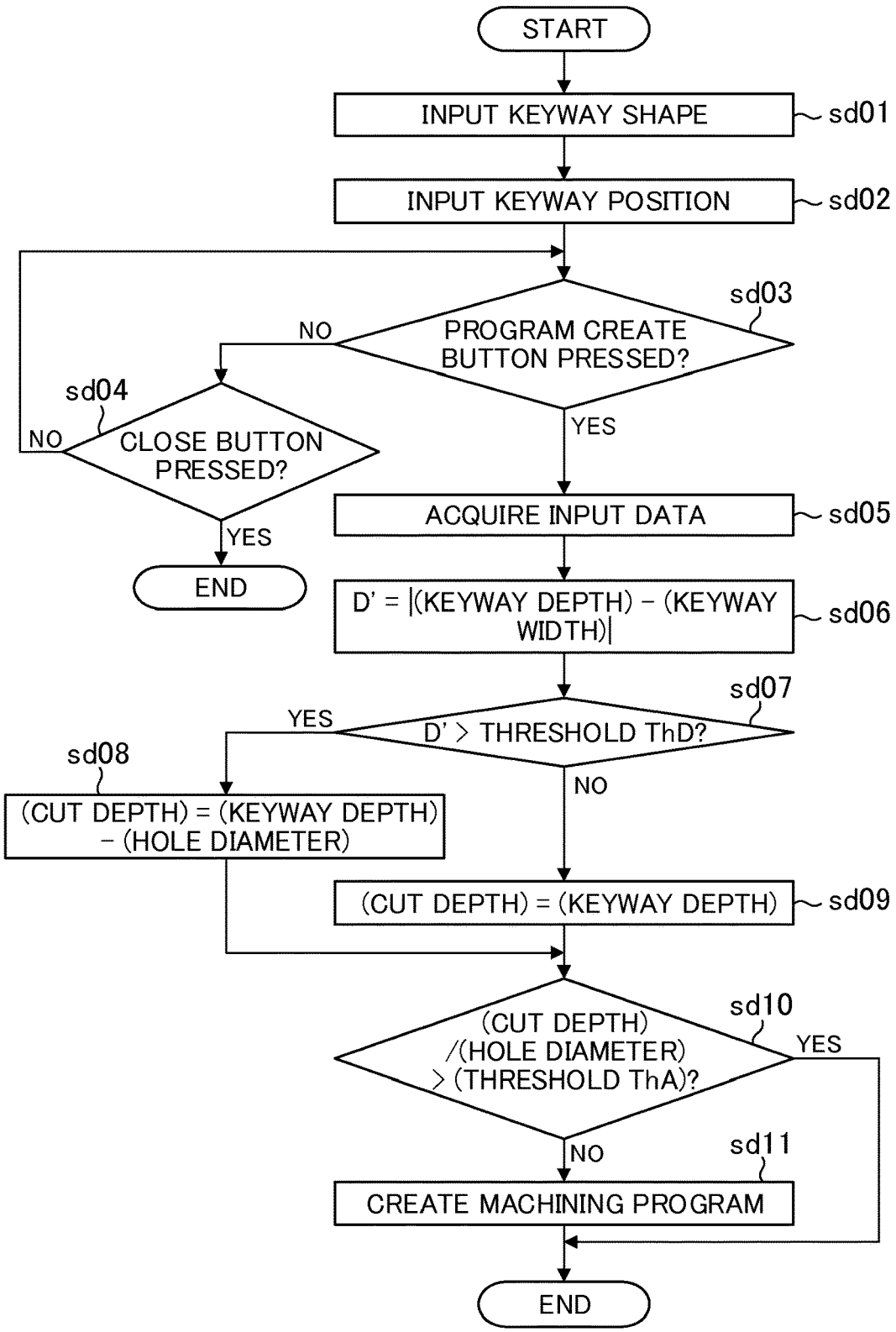
FIG. 15 is a flowchart of a process of comparing a difference between a keyway depth (t or l) and a keyway width (b) with a threshold to calculate a cut depth and determining an error in the input value based on the ratio of the calculated cut depth to the hole diameter.

The process illustrated in FIG. 15 illustrates an example in which the difference between a "keyway depth (t or l)" and a "keyway width (b)" is compared with a threshold to calculate a cut depth, and the ratio between the calculated "cut depth" and a "hole diameter" is compared with a threshold to determine whether there is an error in the values input to the machining path creating device.

Next, an embodiment in which a machining path creating device is mounted on a numerical controller mounted on a wire electric discharge machine and a keyway machining program is created by a macro program will be described.

Figures 7, 8:
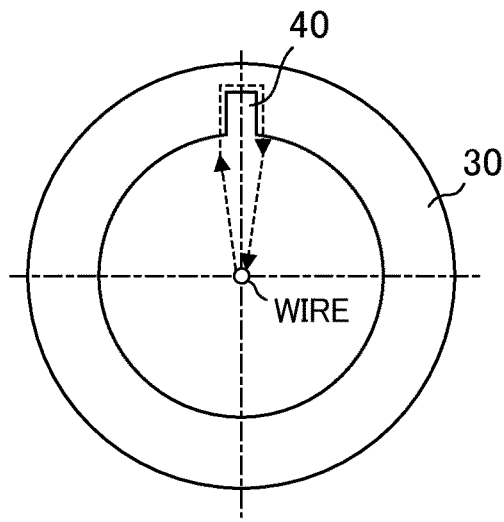
FIG. 7 is a diagram illustrating a machining path when a wire electric discharge machine machines a keyway in a workpiece under the control of the numerical controller (machining path creating device) of FIG. 5.
FIG. 8 is a diagram illustrating an example of a machining program created by an operator.

When the numerical controller 50 executes a program that has the format illustrated in FIG. 8, a keyway machining path is created. The operator creates and executes such a machining program as illustrated in FIG. 8.

When a command G123 is issued, a macro program O8000 illustrated in FIG. 9 is executed. Association between G123 and O8000 is designated by a parameter of the numerical controller 50 in advance.

The macro program O8000 evaluates the designated values of keyway depth (T) and hole diameter (D) (see (A) in FIG. 9).

If (keyway depth (#20))<(hole diameter (#7)), (cut depth (#100))=(keyway depth).

If (keyway depth (#20))=(hole diameter (#7)), (cut depth (#100))=(keyway depth).

If (keyway depth (#20))>(hole diameter (#7)), (cut depth (#100))=(keyway depth)−(hole diameter).

At N200 and later, the machining program is executed with the cut depth input to #100.

Moreover, the macro program O8000 evaluates the designated values of keyway depth (T) and keyway width (B) (see (A) in FIGS. 10 and 11).

If [(keyway depth (#20))/(keyway width (#2))]<(threshold (#101)), (cut depth (#100))=(keyway depth).

If [(keyway depth (#20))/(keyway width (#2))]>(threshold (#101)), (cut depth (#100))=(keyway depth)−(hole diameter).

At N200 and later, the machining program is executed with a cut depth input to #100. The threshold (#101) is set in advance before the macro program is activated.

FIG. 10 illustrates an example in which the ratio between the "keyway depth (t or l)" and the "keyway width (b)" is compared with a threshold to calculate a cut depth. FIG. 11 illustrates an example in which the difference between the "keyway depth (t or l)" and the "keyway width (b)" is compared with a threshold to calculate a cut depth.

Figure 12:
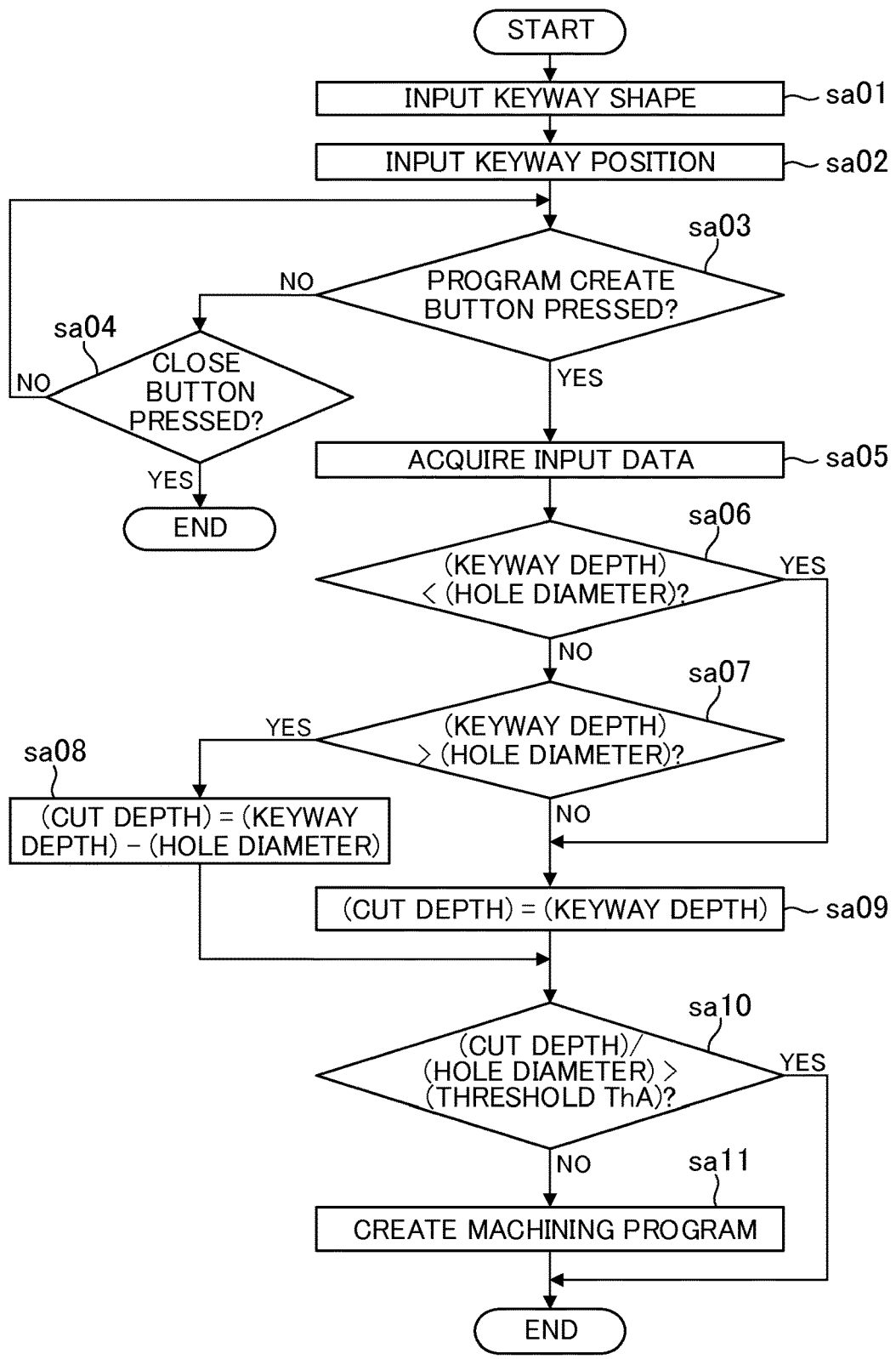
FIG. 12 is a flowchart of a process of comparing a keyway depth (t or l) with a hole diameter (d) to calculate a cut depth and determining an error in the input value based on the ratio of the calculated cut depth to the hole diameter.

FIG. 12 is a flowchart of a process of comparing a keyway depth (t or l) and a hole diameter (d) to calculate a cut depth and determining an error in the input value based on the ratio of the calculated "cut depth" to the "hole diameter".

In step sa01, an operator inputs a keyway shape.

In step sa02, the operator inputs the keyway position.

In step sa03, it is determined whether the "Create Program" button in the screen of FIG. 6 is pressed or not. The process proceeds to step sa05 when the button is pressed and proceeds to step sa04 when the button is not pressed.

In step sa04, it is determined whether the "Close" button in the screen of FIG. 6 is pressed or not. The process ends when the button is pressed and returns to step sa03 when the button is not pressed.

In step sa05, the data input in steps sa01 and sa02 is acquired.

In step sa06, it is determined whether or not the keyway depth is smaller than the hole diameter. The process proceeds to step sa09 when the keyway depth is smaller than the hole diameter and otherwise proceeds to step sa07.

In step sa07, it is determined whether or not the keyway depth is larger than the hole diameter. The process proceeds to step sa08 when the keyway depth is larger than the hole diameter and otherwise proceeds to step sa09.

In step sa08, a value obtained by subtracting the hole diameter from the keyway depth is used as the cut depth and the process proceeds to step sa10.

In step sa09, the keyway depth is used as the cut depth and the process proceeds to step sa10.

In step sa10, it is determined whether or not a value (cut depth)/(hole diameter) is larger than a first threshold ThA. This process ends when the value is larger than the first threshold ThA and otherwise proceeds to step sa11.

In step sa11, a machining program is created and this process ends.

Figure 13:
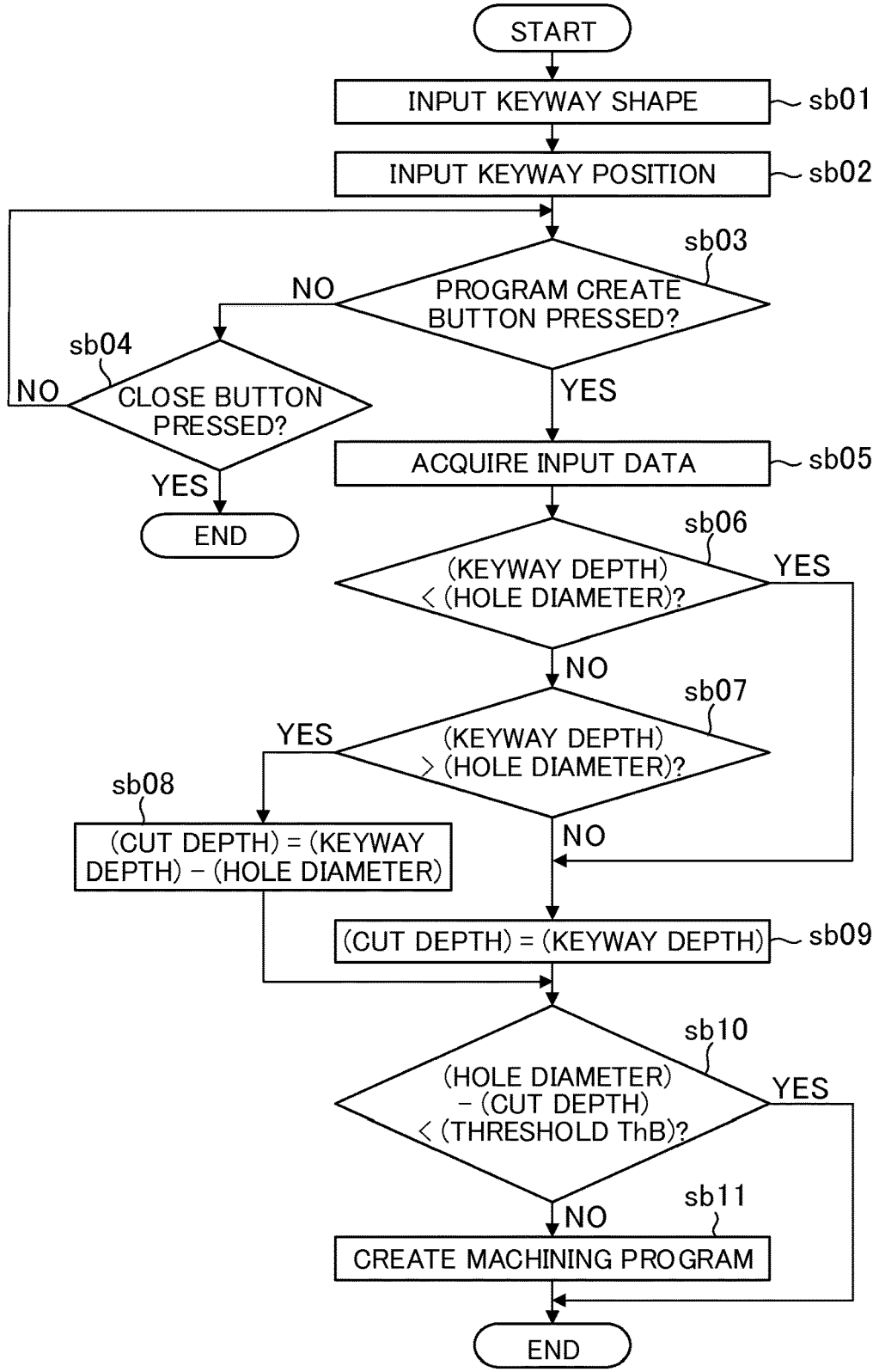
FIG. 13 is a flowchart of a process of comparing a keyway depth (t or l) with a hole diameter (d) to calculate a cut depth and determining an error in the input value based on a value obtained by subtracting the calculated cut depth from the hole diameter (d)

FIG. 13 is a flowchart of a process of comparing a keyway depth (t or l) with a hole diameter (d) to calculate a cut depth and determining an error in the value input by the operator based on a value obtained by subtracting the calculated cut depth from the hole diameter (d). The respective steps will be described.

In step sb01, the operator inputs a keyway shape.

In step sb02, the operator inputs a keyway position.

In step sb03, it is determined whether the "Create Program" button in the screen of FIG. 6 is pressed or not. The process proceeds to step sb05 when the button is pressed and proceeds to step sb04 when the button is not pressed.

In step sb04, it is determined whether the "Close" button in the screen of FIG. 6 is pressed or not. The process ends when the button is pressed and returns to step sb03 when the button is not pressed.

In step sb05, the data input in steps sb01 and sa02 is acquired.

In step sb06, it is determined whether or not the keyway depth is smaller than the hole diameter. The process proceeds to step sb09 when the keyway depth is smaller than the hole diameter and otherwise proceeds to step sb07.

In step sb07, it is determined whether or not the keyway depth is larger than the hole diameter. The process proceeds to step sb08 when the keyway depth is larger than the hole diameter and otherwise proceeds to step sb09.

In step sb08, a value obtained by subtracting the hole diameter from the keyway depth is used as the cut depth and the process proceeds to step sb10.

In step sb09, the keyway depth is used as the cut depth and the process proceeds to step sb10.

In step sb10, it is determined whether or not the value obtained by subtracting the cut depth from the hole diameter (d) is smaller than a second threshold ThB. This process ends when the value is smaller than the second threshold ThB and otherwise proceeds to step sb11.

In step sb11, a machining program is created and this process ends.

FIG. 14 is a flowchart of a process of comparing the ratio between a keyway depth (t or l) and a "keyway width (b)" with a threshold to calculate a cut depth and determining an error in the input value based on the ratio between the calculated cut depth and the hole diameter (d). The respective steps will be described.

In step sc01, the operator inputs a keyway shape.

In step sc02, the operator inputs a keyway position.

In step sc03, it is determined whether the "Create Program" button in the screen of FIG. 6 is pressed or not. The process proceeds to step sc05 when the button is pressed and proceeds to step sc04 when the button is not pressed.

In step sc04, it is determined whether the "Close" button in the screen of FIG. 6 is pressed or not. The process ends when the button is pressed and returns to step sc03 when the button is not pressed.

In step sc05, the input data is acquired.

In step sc06, the value of (keyway depth)/(keyway width) is calculated as C'.

In step sc07, it is determined whether or not C' calculated in step sc06 is larger than a third threshold ThC. This process proceeds to step sc08 when C' is larger than the third threshold ThC and otherwise proceeds to step sc09.

In step sc08, a value obtained by subtracting the hole diameter from the keyway depth is used as a cut depth and the process proceeds to step sc10.

In step sc09, the keyway depth is used as a cut depth and the process proceeds to step sc10.

In step sc10, it is determined whether or not the value of (cut depth)/(hole diameter) is larger than a first threshold ThA. This process ends when the value is larger than the first threshold ThA and otherwise proceeds to step sc11.

In step sc11, a machining program is created and this process ends.

FIG. 15 a flowchart of a process of comparing a difference between a keyway depth (t or l) and a keyway width (b) with a threshold to calculate a cut depth and determining an error in the input value based on the ratio of the calculated cut depth to the hole diameter (d). The respective steps will be described.

In step sd01, an operator inputs a keyway shape.

In step sd02, the operator inputs the keyway position.

In step sd03, it is determined whether the "Create Program" button in the screen of FIG. 6 is pressed or not. The process proceeds to step sd05 when the button is pressed and proceeds to step sd04 when the button is not pressed.

In step sd04, it is determined whether the "Close" button in the screen of FIG. 6 is pressed or not. The process ends when the button is pressed and returns to step sd03 when the button is not pressed.

In step sd05, the input data is acquired.

In step sd06, the absolute value of a value obtained by subtracting the keyway width from the keyway depth is calculated as D'.

In step sd07, it is determined whether or not D' calculated in step sd06 is larger than a fourth threshold ThD. This process proceeds to step sd08 when D' is larger than the fourth threshold ThD and otherwise proceeds to step sd09.

In step sd08, a value obtained by subtracting the hole diameter from the keyway depth is used as a cut depth and the process proceeds to step sd10.

In step sd09, the keyway depth is used as a cut depth and the process proceeds to step sd10.

In step sd10, it is determined whether or not the value of (cut depth)/(hole diameter) is larger than a first threshold ThA. This process ends when the value is larger than the first threshold ThA and otherwise proceeds to step sd11.

In step sd11, a machining program is created and this process ends.

As described above, with the keyway machining path creating device according to the present invention, the operator needs only to input machining dimensions illustrated in the drawing without the need to understand whether a machining dimension designated in the drawing is a "cut depth" or a "measured depth" when creating a NC program for machining a keyway in a workpiece. Moreover, the operator does not need to switch the operation of the keyway machining path creating device according to whether the designated machining dimension in the drawing is the "cut depth" or the "measured depth". Due to this, it is possible to prevent data input errors and to prevent machining errors.

The present invention is different from the conventional technique disclosed in Japanese Patent Application Laid-Open No. 8-153132 in that a keyway database is not mounted and shape parameters only are compared.

Moreover, in the description of the embodiment of the present invention, a moving path of a wire electrode created by a machining program and a numerical controller is illustrated as a machining path created by the machining path creating device. Besides this method, a machining path diagram for allowing the operator to check a machining path and image creation data and figure data that can be edited by a CAD/CAM apparatus may be used so that these items of data are converted to a machining program by such an external apparatus as the CAD/CAM apparatus.

What is claimed is:

1. A machining path creating device for a wire electric discharge machine, the machining path creating device configured to create a machining path for machining a keyway in a side surface of a round hole, the machining path creating device comprising:
    a keyway shape input unit configured to receive input of a shape of the keyway to be machined, the shape of the keyway including a keyway depth which is either
        (a) a first distance from (i) a keyway width center of the keyway on the side surface of the round hole to (ii) a bottom of the keyway, or
        (b) a second distance from (i) the side surface of the round hole on a side opposite the keyway width center to (ii) the bottom of the keyway;
    a hole shape input unit configured to receive input of a diameter and a center position of the round hole; and
    a processor configured to
        create a machining path, and
        compare the keyway depth input by the keyway shape input unit with the diameter of the round hole input by the hole shape input unit,
        wherein
            when the input keyway depth is smaller than the diameter of the round hole, the processor is configured to determine the input keyway depth as a cut depth of the keyway, the cut depth being a distance from the side surface of the round hole to the bottom of the keyway, and
            when the input keyway depth is larger than the diameter of the round hole, the processor is configured to determine a difference between the input keyway depth and the diameter of the round hole as the cut depth of the keyway, and
    wherein the wire electric discharge machine is configured to machine the keyway in accordance with the created machining path with the cut depth determined by the processor.

2. The machining path creating device according to claim 1, wherein
    the processor is configured to stop creating the machining path when determining that a ratio between the cut depth of the keyway determined by the processor and the diameter of the round hole exceeds a predetermined threshold.

3. A machining path creating device for a wire electric discharge machine, the machining path creating device configured to create a machining path for machining a keyway in a side surface of a round hole, the machining path creating device comprising:
    a keyway shape input unit configured to receive input of a shape of the keyway to be machined, the shape of the keyway including a keyway depth which is either (a) a first distance from (i) a keyway width center of the keyway on the side surface of the round hole to (ii) a bottom of the keyway, or
(b) a second distance from (i) the side surface of the round hole on a side opposite the keyway width center to (ii) the bottom of the keyway;
a hole shape input unit configured to receive input of a diameter of the round hole; and
a processor configured to
create a machining path,
compare the keyway depth input by the keyway shape input unit with the diameter of the round hole input by the hole shape input unit,
wherein
when the input keyway depth is smaller than the diameter of the round hole, the processor is configured to determine the input keyway depth as a cut depth of the keyway, the cut depth being a distance from the side surface of the round hole to the bottom of the keyway, and
when the input keyway depth is larger than the diameter of the round hole, the processor is configured to determine a difference between the input keyway depth and the diameter of the round hole as the cut depth of the keyway, and
measure a center position of the round hole by bringing a wire electrode or a touch probe into contact with a workpiece to thereby create the machining path,
wherein the wire electric discharge machine is configured to machine the keyway in accordance with the created machining path with the cut depth determined by the processor.

4. A machining path creating device for a wire electric discharge machine, the machining path creating device configured to create a machining path for machining a keyway in a side surface of a round hole, the machining path creating device comprising:
a keyway shape input unit configured to receive input of a shape of the keyway to be machined, the shape of the keyway including a keyway depth which is either
(a) a first distance from (i) a keyway width center of the keyway on the side surface of the round hole to (ii) a bottom of the keyway, or
(b) a second distance from (i) the side surface of the round hole on a side opposite the keyway width center to (ii) the bottom of the keyway;
a hole shape input unit configured to receive input of a diameter and a center position of the round hole; and
a processor configured to
create a machining path, and
compare the keyway depth input by the keyway shape input unit with the diameter of the round hole input by the hole shape input unit,
wherein
when the input keyway depth is smaller than the diameter of the round hole, the processor is configured to determine the input keyway depth as a cut depth of the keyway, the cut depth being a distance from the side surface of the round hole to the bottom of the keyway, and
when the input keyway depth is larger than the diameter of the round hole, the processor is configured to determine a difference between the input keyway depth and the diameter of the round hole as the cut depth of the keyway,
wherein the processor is configured to stop creating the machining path when determining that a difference between the diameter of the round hole and the cut depth of the keyway determined by the processor is smaller than a predetermined threshold, and
wherein the wire electric discharge machine is configured to machine the keyway in accordance with the created machining path with the cut depth determined by the processor.

5. A machining path creating device for a wire electric discharge machine, the machining path creating device configured to create a machining path for machining a keyway in a side surface of a round hole, the machining path creating device comprising:
a keyway shape input unit configured to receive input of a shape of the keyway to be machined, the shape of the keyway including a keyway depth which is either
(a) a first distance from (i) a keyway width center of the keyway on the side surface of the round hole to (ii) a bottom of the keyway, or
(b) a second distance from (i) the side surface of the round hole on a side opposite the keyway width center to (ii) the bottom of the keyway;
a hole shape input unit configured to receive input of a diameter and a center position of the round hole; and
a processor configured to
create a machining path, and
compare the keyway depth and a keyway width input by the keyway shape input unit,
wherein
when a ratio or difference between the input keyway depth and the input keyway width does not exceed a predetermined threshold, the processor is configured to create the machining path such that the input keyway depth is determined as a cut depth of the keyway, the cut depth being a distance from the side surface of the round hole to the bottom of the keyway, and
when the ratio or difference between the input keyway depth and the input keyway width exceeds the threshold, the processor is configured to create the machining path such that a difference between the input keyway depth and the diameter of the round hole is determined as the cut depth of the keyway, and
wherein the wire electric discharge machine is configured to machine the keyway in accordance with the created machining path with the cut depth determined by the processor.

6. The machining path creating device according to claim 5, wherein
the processor is configured to stop creating the machining path when determining that a ratio between the cut depth of the keyway determined by the processor and the diameter of the round hole exceeds a predetermined threshold.

7. The machining path creating device according to claim 5, wherein
the processor is configured to stop creating the machining path when determining that a difference between the diameter of the round hole and the cut depth of the keyway determined by the processor is smaller than a predetermined threshold.

8. A machining path creating device for a wire electric discharge machine, the machining path creating device configured to create a machining path for machining a keyway in a side surface of a round hole, the machining path creating device comprising:

a keyway shape input unit configured to receive input of a shape of the keyway to be machined, the shape of the keyway including a keyway depth which is either
  (a) a first distance from (i) a keyway width center of the keyway on the side surface of the round hole to (ii) a bottom of the keyway, or
  (b) a second distance from (i) the side surface of the round hole on a side opposite the keyway width center to (ii) the bottom of the keyway;
a hole shape input unit configured to receive input of a diameter of the round hole; and
a processor configured to
  create a machining path, and
  compare the keyway depth and a keyway width input by the keyway shape input unit,
  wherein
    when a ratio or difference between the input keyway depth and the input keyway width does not exceed a predetermined threshold, the processor is configured to determine the input keyway depth as a cut depth of the keyway, the cut depth being a distance from the side surface of the round hole to the bottom of the keyway, and
    when the ratio or difference between the input keyway depth and the input keyway width exceeds the threshold, the processor is configured to determine a difference between the input keyway depth and the diameter of the round hole as the cut depth of the keyway, and
  measure a center position of the round hole by bringing a wire electrode or a touch probe into contact with a workpiece to thereby create the machining path, and
wherein the wire electric discharge machine is configured to machine the keyway in accordance with the created machining path with the cut depth determined by the processor.

* * * * *